United States Patent [19]

Madsen et al.

[11] Patent Number: 4,888,529

[45] Date of Patent: Dec. 19, 1989

[54] TELEVISION RECEIVER HAVING MEANS FOR THE SUPPRESSION OF LINE FLICKER

[75] Inventors: Knud E. Madsen; Runo R. Nielsen, both of Struer, Denmark

[73] Assignee: Bang & Olufsen A/S, Struer, Denmark

[21] Appl. No.: 236,722

[22] Filed: Aug. 26, 1988

[30] Foreign Application Priority Data

Aug. 26, 1987 [DK] Denmark .................................. 4444

[51] Int. Cl.[4] ............................................. H01J 29/56

[52] U.S. Cl. .................................................... 315/370

[58] Field of Search ................................ 315/370, 371

*Primary Examiner*—Theodore M. Blum

*Attorney, Agent, or Firm*—Antonelli, Terry & Wands

[57] ABSTRACT

A television receiver which includes an arrangement for the suppression of a line flicker having a detector unit for detecting a potenting line flicker producing operation of the television receiver and a control unit responsive to a detection signal from the detector unit for producing a correction signal to a vertical deflection system of a picture reproducing unit of the television receiver whereby a line track of the picture spot is displaced upwardly or downwardly to a location near or nearer a line level of a corresponding neighboring line in a proceeding half-picture. The detector unit provides a continuous detection of a difference between an intensity of an actual video signal and an intensity of the actual video signal reproduced in a picture spot and at least an overlying or underlying line on a television screen. The control unit is adapted to produce a correction signal only upon a detection by the detector unit that the picture spot is moved along a line portion forming a horizontal line of separation between an overlying picture area and an underlying picture area of a pronounced differing light intensity.

11 Claims, 5 Drawing Sheets

FIG. 5
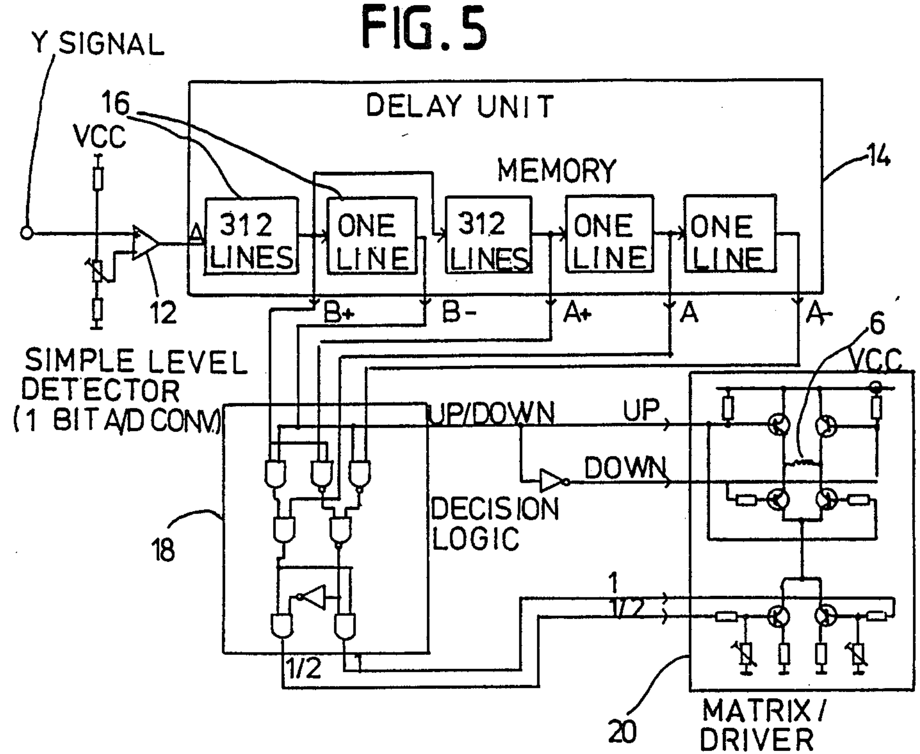
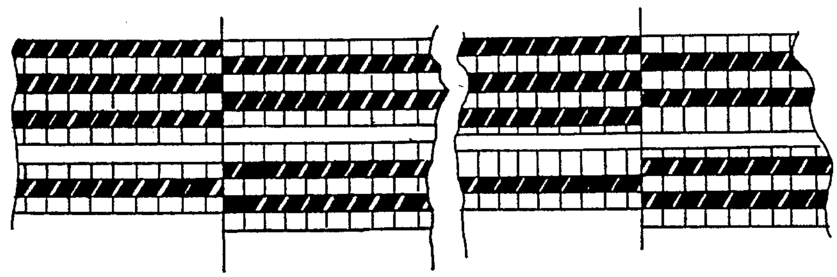
FIG. 6a
FIG. 6b

TELEVISION RECEIVER HAVING MEANS FOR THE SUPPRESSION OF LINE FLICKER

BACKGROUND OF THE INVENTION

The present invention relates to a television receiver having means for suppressing the so-called line flicker.

It is an international standard that TV pictures are transmitted and reproduced according to the interlace principle, whereby a whole picture consists of a number of lines and is composed of two half pictures, one of which is formed by the even numbered lines of the whole picture, while the other half picture comprises or is provided by the intermediate uneven line numbers. The two half pictures are reproduced in an alternating manner by a fast, successive scanning of the respective lines. The lines, though disposed with small mutual spacing, are clearly recognizable on TV screens of usual sizes.

In the reproduction of pictures with soft light intensity transitions between different horizontal sub areas of the whole picture the alternating jumps between the two interlaced half pictures are visually acceptable, which is true also, generally for rapidly moving pictures, but in stillstanding and slowly moving pictures with sharp dark/light transitions clearly visible line jumps may be observed. In the two half pictures, the border line between the white/light area and the black-/dark area will be reproduced with a mutual spacing of one line due to the alternating reproduction of the two half pictures. This is called line flicker, as the jumps as such may not be clearly visible, but rather manifest themselves as an unpleasant flicker. The whole picture frequency is 50 or 60 Hz, and the discussed jumps of the transition line between light and dark in the two half pictures will thus take place with a frequency as low as 25 or 30 Hz. It is a widely used standard that the whole picture holds a total of 625 lines, and the eyes of a viewer, who is placed at a normal distance from a reasonably large screen, may well perceive disturbances when such a transition or border line carries out jumps of approximately 1/625 of the height of the screen. Another applied standard comprises only 525 lines.

Methods have already been proposed for removing or making invisible the line flicker in an interlaced TV picture, but it has been found that the result is obtained at the expense of other kinds of disturbances of the picture, such that the problem really has just been pushed, and the associated techniques have even been expensive. According to one known solution use is made of a so-called progressive scanning, whereby the preceding half picture is stored by a memory and is reproduced together with the new half picture, such that the reproduced picture is a whole picture produced by a simultaneous reproduction in both line systems. Hereby a stationary horizontal border line will of course not carry out any jump, but as the memorized half picture is reproduced with a certain delay, the border lines between details of the picture may easily get blurred when there are movements in the picture, because the stored half picture all the time will show a movement phase belonging to the past. Thus, vertical border or separation lines which are moved horizontally will become jagged and therewith blurred, while a horizontal separation line which is moved vertically will carry out the movement in an unevenly jumping manner, which manifests itself as bluriness or muzziness. With another type of proposal the two last half pictures are stored in a memory, whereafter they are reproduced sequentially two times with a doubled frequency. Here the picture is still interlaced, but the frequency being doubled, also the frequency of all flicker will be doubled, whereby the flicker becomes invisible. However, it gives rise to a certain muzziness, and moreover the problem will exist that the reproduction is effected in a manner partly distorted with respect to the time, whereby even movements of separation lines are percieved as shaky or muzzy.

Line flicker is particularly problematic in pictures with text or graphics, and for some types of such reproductions, for example so-called teletext or -graphics, it has already been suggested to solve the problem with the use of a correction signal that is supplied to the vertical deflector system so as to effect a displacement of one half picture into coincidence with the other half picture. Hereby the resulting number of lines will be halved, i.e. the lines will be more clearly visible, but this may be visually acceptable for just that kind of reproductions, particularly when the line flicker is suppressed. The correction signal is derivable from a blanking signal which marks the cease of the original video signal and the start of the teletext signal. However, such a technique, which is described in DE-A-30 38 144 and 34 41 905, is not practically usable in connection with ordinary video pictures, where the vertical picture resolution would be unacceptably reduced.

It is the purpose of the invention to provide a TV receiver having means for removing the line flicker in a simple and efficient manner and without disturbing the correct succession of the half pictures, i.e. without the drawbacks associated therewith, and without giving rise to other considerable deficiencies of the reproduction.

The invention is based on the recognition that the last mentioned prior proposal may be further developed so as to be successfully usable with ordinary video pictures, for example by causing the line track on the screen to be locally displaced at such and only such place or places where dark/light transitions occur in the vertical direction, such that these transition places in the respective two half pictures will be brought closer to each other or be brought to fall together without the remaining picture details being treated in the same manner. The control signal to bring about such a displacement of a line or line portion in one or both half pictures is produceable based on a detection of the occurrence of the said abrupt dark/light transitions by detector means as described below.

Hereby the line flicker can be counteracted purely locally, by a local displacement of a line or a portion of a line in one or both half pictures, and it is thus not necessary to give up the use of the interlacing principle nor the successive, time true reproduction of the half pictures, whereby a first result is that with this solution of the problem it is at least ensured that the solution is not transformed into new problems elsewhere on the screen. As explained below it has been found, moreover, that the solution according to the invention is usable also without giving rise to perceivable distortions of the reproduction at the critical places themselves, and that even additional advantages have been observed, i.e. the invention may be realized in a manner such that the problem is solved practically without disadvantageous side effects.

According to the invention there is accordingly provided a television receiver having means for suppression of line flicker, such means comprising a detector unit for detecting a potential line flicker producing operation of the receiver and a control unit, which, in response to such a detection, is operable to produce a correction signal to the vertical deflector system of the picture reproducing unit of the receiver, by which the line track of the picture spot is disposed upwardly or downwardly to a location near or nearer the line level of the corresponding neighboring line in the preceding half picture. The detector unit is designed and arranged for continuous detection of the difference between the intensity of the actual video signal and the intensity of the video signal reproduction in a corresponding spot in at least one overlying or underlying line in an interlace pattern on the screen, and the control unit is operable to produce the control signal only in such situations in which it is detected by the detector unit that the picture spot is moved along a line portion forming a horizontal line of separation between over- and underlying picture areas of pronounced mutually different light intensity.

The local deformation or displacement of a line or a line portion on the screen of a traditional TV receiver is easily achievable by a modulation of the current to the vertical deflector coil for the cathode ray beam, which is sent against the inner side of the screen for describing or providing the lines by an associated horizontal deflection, or, respectively, by feeding a current to an additional vertical deflector coil, which will thereby weaken or strengthen the effect of the ordinary deflector coil, when corrections are to be made. When a detection of the light contents of some successive lines has revealed a jump of the light intensity, such a detection should be used for producing a change of the vertical deflection to the effect that a compression takes place towards the light area, since by a displacement of a line a dark area will be left, which should naturally be associated with the already dark area. It is achievable hereby that a separation line in one of the half pictures can be displaced to coincide exactly with the corresponding separation line in the other half picture, such that the line flicked will be totally eliminated.

What is left is that a slightly increased contrast between the light and the dark areas on the respective sides of the separation line will occur, because the light border area will be still lighter by the contribution of the corrected half picture, while the correction itself will induce an increased darkness in the dark area immediately adjacent the border line; however, experiments have proved, that this is in no way any disadvantage, but rather a direct advantage for a good picture reproduction. The reproduction of sharp transitions is improved considerably without any associated reduction of the reproduction quality of the less sharp transitions and without any problems with respect to panned or diffusely moving pictures.

For detecting the light contents of some previous and some following lines it is necessary to make use of a delay unit that will register the light contents prior to the lines being reproduced on the screen, and since some of these lines belong to the previous half picture, it is also with the invention required to employ a memory for these corresponding lines of the preceding half picture. However, the information to be memorized only has to relate to the respective points being pronounced dark or light, as the information should not be used for a renewed reproduction of the half picture, and information of such a type may be stored by a relatively simple memory unit.

BRIEF DESCRIPTION OF THE DRAWINGS

The invention, which is defined in the appended claims, will now be described in more detail with reference to the accompanying drawings, in which:

FIGS. *2a, 2b, 2c* are plan views of a part of the screen for the illustration of line flicker, FIGS. *3a, 3b, 3c* are corresponding views illustrating the effect of the invention, FIGS. *4a, 4b, 4c* are corresponding views illustrating a change as taking place on a picture line, FIG. 5 is a schematic diagram of a control unit according to the invention, FIGS. *6a, 6b* are fragmentary views of the screen for illustration of a single line correction.

DETAILED DESCRIPTION

Figure 1:
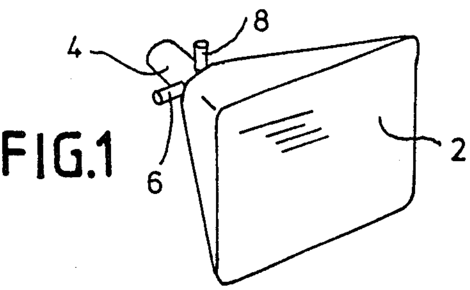
FIG. 1 is a schematic perspective view of a TV picture tube.

Referring now to the drawings wherein like reference numerals are used throughout the various views to designate like parts and, more particularly, to FIG. 1, according to this figure, a picture tube of a television receiver includes a screen 2 which is hit by an electron beam from a beam gun 4, and a deflector coil 6 is provided for deflecting the beam in the vertical direction, while a deflector coil 8 is provided for deflecting the beam in the horizontal direction. These coils 6, 8 are controlled in a coordinated manner such that the beam is guided down along the screen 2 at an even rate of velocity and is at the same time guided laterally one way and rapidly the other way for describing a number of horizontal lines on the screen 2. The beam 15 being intensity modulated such that it will leave a light track with a varying intensity all according to the contents of the picture signal as received from the TV transmitter. According to the national standard the number of lines is 625, but other standards such as 525 and 1125 lines are known and used elsewhere.

In practice, however, the picture signals of each whole picture are transmitted so as to divide the picture in two half pictures, of which the first is produced along the lines 1, 3, 5 etc., while the following half picture is produced along the intermediary lines 2, 4, 6 etc., whereby it is relevant to speak of an "interlaced" picture. If the whole picture comprises a sharp horizontal separation between a light sub-area and a dark sub-area, the associated line of separation cannot be located at the same place in the two half pictures, this being illustrated in FIGS. *2a–2c.* Here the first half picture is shown at *2a,* and the single lines are designated A, while the following half picture is shown in FIG. *2b,* in which the lines are designated B. FIG. *2c* shows the next following half picture, which is here supposed to be identical with the first half picture according to FIG. *2a.* It is illustrated that the lines in the respective half pictures are located so as to occupy the free spaces between each other. This is not fully representative of the reproduction on a usual picture screen, where passive separation lines occur between the lines of the whole picture, but these separation lines, which are normally dark, are of secondary importance for the invention, and the illustrations are more easily understood when these areas remain non-illustrated. The "empty" lines in each half picture are marked by a vertical hatching and are designated M. These lines are relatively dark.

Figures 2A, 2B, 2C:
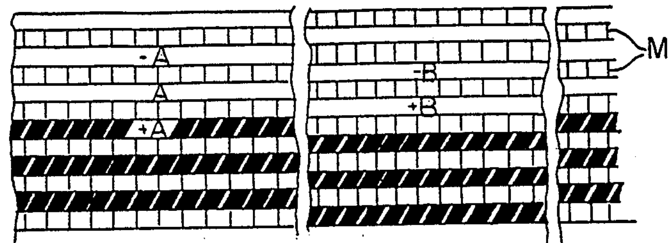

The line designated A is a light line, while the overlying line −A is also light and the underlying, i.e. subsequent line +A is a dark line. The line A is the lowermost line in an upper light picture area, while the line +A is the uppermost dark line in a lower, dark picture area. The line A is the line which is actually generated by the picture point, i.e. such that −A is the previously generated line and +A is the line which will be generated by the next line passage in the respective half picture. In a corresponding manner +B in FIG. 2*b* designates the line in the following half picture corresponding to the line A, i.e. this line +B is reproduced with a delay of one half picture after the reproduction of the line A. +B is shown located in the empty line level just underneath the line A, but the respective "corresponding" line might as well be represented by the line −B. In both cases the lowermost light line in the upper, light picture area will jump an entire whole picture line up and down between the successive half pictures, and this is what amounts to line flicker. This phenomenon may be visible whenever a horizontal separation line exists between a light and a dark area, also while the picture is in a horizontal motion, i.e. by pannings and horizontally rolling texts.

Figures 3A, 3B, 3C:
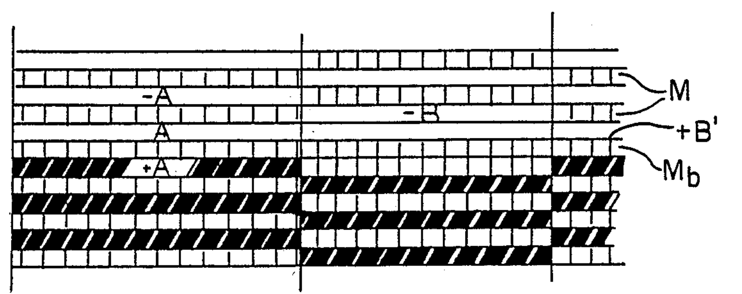

According to the invention it is detected, however, a substantial shift of light intensity occurs in a vertical area stretching over some lines of the whole picture, i.e. over a few lines in both the preceding and the actual half picture, suitable delay means being used in this connection, and, if such a jump is detected, the detector signal is used to produce a parallel displacement of the relevant line in the half picture that is actually reproduced, for example, by affecting the vertical deflection control of the picture point in such a manner that the relevant line will be displaced towards or into coincidence with that line of the preceding half picture which constituted the light border line in the whole picture in the transition between the light and the dark picture area. Hereby the separation line will be reproduced with identical location in the two half pictures, and thus it will not move up and down as mentioned above. This is illustrated in FIGS. 3*a*–3*c*, in which FIG. 3*a* is identical with FIG. 2*a*, while in FIG. 3*b* it is shown that the lower light line +B from FIG. 2*b* has been displaced up into the empty line just underneath the line −B, which is located in the same level as the line A in the preceding half picture. The thus displaced line, designated +B′ leaves an empty line Mb just underneath itself, but this line is naturally integrated with the lower dark picture area. What is important is that the lowermost light line +B′ or the line A, respectively, of the light picture area will be located in the same level in the two half pictures. The advantage of this arrangement will be obvious, for example, that the line flicker will simply disappear. This is obtained at the expense of an associated picture distortion by a displacement of the line +B to +B′, but since the line will hereby leave a dark line ($M_b$) in the area which is already dark there will be no real distortion, but rather a practically non-perceivable side effect. This side effect also accounts for the light intensity in the lowermost light line A,+B′ to be increased by the lines −B and +B′ being brought closely together, but it has been observed that this "distortion" is visually perceived as profitable for the reproduced picture, i.e. the "distortion" involves an advantage and not a disadvantage.

Figures 4A, 4B, 4C:
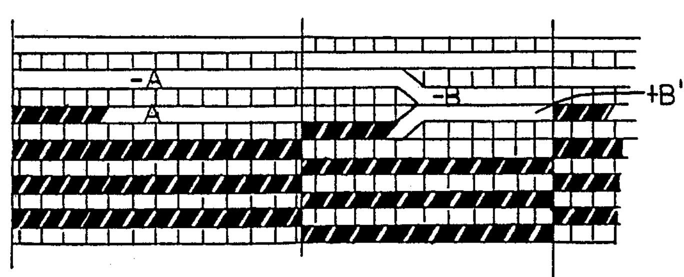

FIGS. 4*a*–4*c* illustrate a dynamic course in which the picture point in a line A at one place changes from dark to light just above a dark picture area, the next half picture then being corrected by the immediately adjacent line +B at the same place first being corrected back from its previous, displaced B′-position down to its normal position, whereafter the following line in the same half picture will be lifted to its +B′-position immediately when the picture point changes from dark to light in the relevant +B′-line.

If there are rapid horizontal movements in the picture, for example, if the picture point transition between dark and light in FIG. 4*a* is displaced towards the right, an error will occur in that the correction of the displacement of the picture point will be initiated a little too early, such that the dark line portion happens. to extend slightly up into the area designated +B′ in FIG. 4*b*. This, however, does not at all give rise to visual disturbance. While in the prior art there are quite considerable problems connected with the non-time-true reproduction of the successive half pictures, no perceivable disturbances will be produced by the reproduction according to the invention, despite a not fully 'place-true' reproduction of isolated picture details.

For the detection of an occurring light intensity jump with the purpose of correcting the actual half picture it is required to carry out an intensity measurement of the actual picture point A as well as of corresponding points in some lines of the whole picture just above and just underneath the actual point A. The corresponding points in the immediately adjacent lines +B and −B from the previous half picture may be detected simultaneously with the actual picture point A when measuring signals therefrom are fed to the detector with respective required delays, and the same will be true for the signal value of the corresponding point in the half picture line −A above the actual line A, this signal only having to be delayed corresponding to a single line. It is also desirable or necessary to detect the corresponding point in the next following line +A, this being possible by a general delay of the video signal between the detector and the reproduction unit. By a delay corresponding to a single line the actually detected value will pertain to the line +A, and the other values fed with suitable delays will then represent the intensity in the corresponding points in the overlying lines, in which A is still the actually presented or described line on the screen.

As shown in FIG. 5, the received video signal is passed through a level detector 12 to a memory unit 14, which includes a row of delay units 16, which are operable, with the indicated delays, to produce respective intensity signals to a detector unit 18, which provides outlet signals to a control unit 20 for affecting the vertical deflector system 6 of the reproducing device. The detector 18 is designed such that, based on the received signals, it will detect whether, at the relevant place of the picture, a vertical area exists in which a contrast transition is present between picture areas each consisting of two or more lines, and, upon an occurrence of such an event, the detector affects the control unit so as to produce the described displacement of the line upwardly or downwardly as required, such that the light border line is displaced from the dark area towards the light area for a non-jumping reproduction of the separation line. In this situation an outlet line designated "1" from the control unit 18 will provide a signal to the control unit to the effect that the line displacement will amount to just a single line in the whole picture.

It may happen that a detected intensity jump will refer to the presence of a narrow light line consisting of a single light line in each half picture, and, in that case, there will be no criterion for orientating the displacement of the line from a dark towards a light area, though a line displacement up or down as required can still be employed. As shown in FIG. 5, it is possible to select a better solution, for example, to permit the detector 18 be designed such that in such cases it will produce a particular "half line" signal represented by the outlet line "½". This "half line" signal, through the control unit 20, results in the respective lines of both the half pictures being displaced one half of a line width towards each other, whereby a merging of the two lines is obtained in the most natural way. This is graphically illustrated in FIGS. 6*a*, 6*b*, in which the jumping light line is illustrated in FIG. 6*a*, while the corrected, coinciding line in the two half pictures is shown in FIG. 6*b*.

It has been found that in practice it may be reasonably acceptable to make use of a line displacement of ⅔ of a line width, and if so there will be no requirement for obtaining a distinguishing between requirements of displacing a line a whole line width or only half a line width, as a displacement of ⅔ line width may be used in both of the above instances. Of course, it is also possible to select a displacement by another value, e.g. approximately 0.8 line width.

Figure 7:
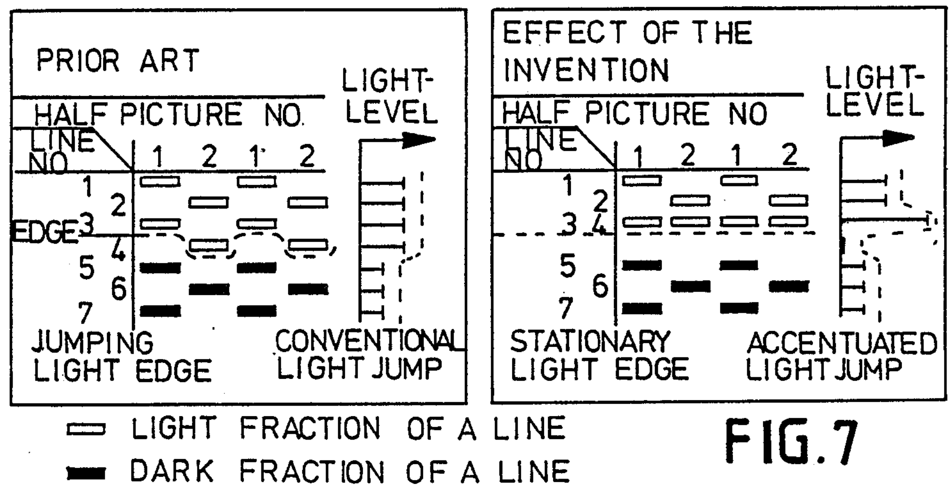
FIGS. 7 and 8 are graphic illustrations of two examples of line flicker and suppressed line flicker, respectively.
Figure 8:
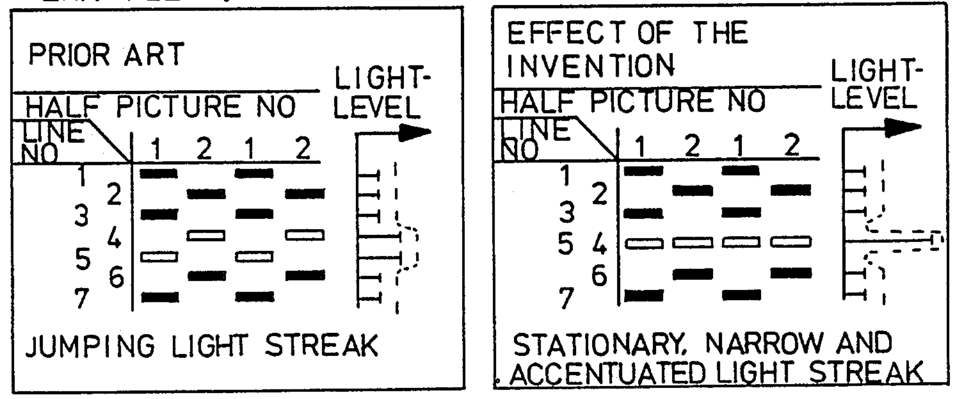

FIGS. 7 and 8, which are widely self explanatory, graphically illustrate two example comparing conventional constructions with the effects achieved by the present invention. More particularly, as shown in these figures the light intensity in a line shaped transition area with a conventional reproduction will be evenly increasing or decreasing across the jumping line area, while with the invention the light area in the transition area will show an increased intensity, just as the dark area will be still darker than the adjacent dark area. This may well amount to a distortion, but it has been found that visually it is rather a quite lucky one, in as far as the transitions are marked with a high degree of clarity without seeming unnatural.

It should be mentioned that for the correction of the line deflection it is preferable to make use of a separate, small deflector coil, which, physically, is placed in parallel with the ordinary vertical deflector coil, such that the corrections may be effected without the inertia that would be connected with electrical corrections on the ordinary deflector coil. With the use of only few windings on the additional coil it is possible to effect relevant momentary corrections, such that selective corrections may be effected over quite short partial lengths of the lines. By way of example, even thin, inclined streaks in the picture will hereby be reproduced with substantially reduced flicker.

In principle it is possible to utilize the system according to the invention on the transmitter side, where the required picture analysis according to FIG. 5 may be carried out centrally for a production of relevant signal corrections in the transmitted signal, or for transmission of a control signal for driving the additional deflector coil in the receivers.

As well known there is another flicker phenomenon called screen flicker, which is caused by the fact that the picture frequency is as low as 50/60 Hz, whereby it is possible to visually realize that the picture is not fully steady. Normally the screen flicker is perceived as still more disturbing than the line flicker as here being treated, and for this reason the invention will be particularly important when used in combination with means for eliminating the screen flicker. As already mentioned it is known to eliminate the line flicker by a doubling of the picture frequency, and this is also an efficient expedient for eliminating the screen flicker, though with the associated problems with respect to a non-time-true reproduction of one of the half pictures. There exists a still further method of eliminating the screen flicker, for example, a doubling of the picture frequency in such a manner that each half picture is shown twice in immediate succession, i.e. with the half pictures shown in the sequence A,A,B,B,A,A,B,B etc., with the respective half pictures being stored in a memory and reproduced twice within the normal half picture period. This reproduction is time-true and free of screen flicker, but it is entirely indifferent to line flicker. Just in that connection the present invention will be particularly advantageous, because it will then lead to a correct picture entirely without flicker, and moreover the invention may then be realized in a relatively simple manner, because advantage can be taken of the presence of the already existing half picture memory.

In that connection it will even be possible to utilize a more differentiated memory with respect to the light intensity in the points or areas relevant to the invention, and both by this fact and based on other criteria it will be possible to control the line deflection for achieving analogue corrections, which are not bound to take place as one or more predetermined jumps. Thus, for a still better performance it may be desired to measure the luminance signal not only as 'dark' or 'light', but in a graduated manner on a grey scale of for example, eight levels. In that case the simple 1-bit A/D converter shown to the left in FIG. 5 should be a plural bit converter, and of course the decision logic unit 18 should be adapted correspondingly in order to produce an optimal, graduated line displacement all according to the degree of contrast between the respective 'dark' and 'light' or rather 'darker' and 'lighter' picture details.

Figure 9:
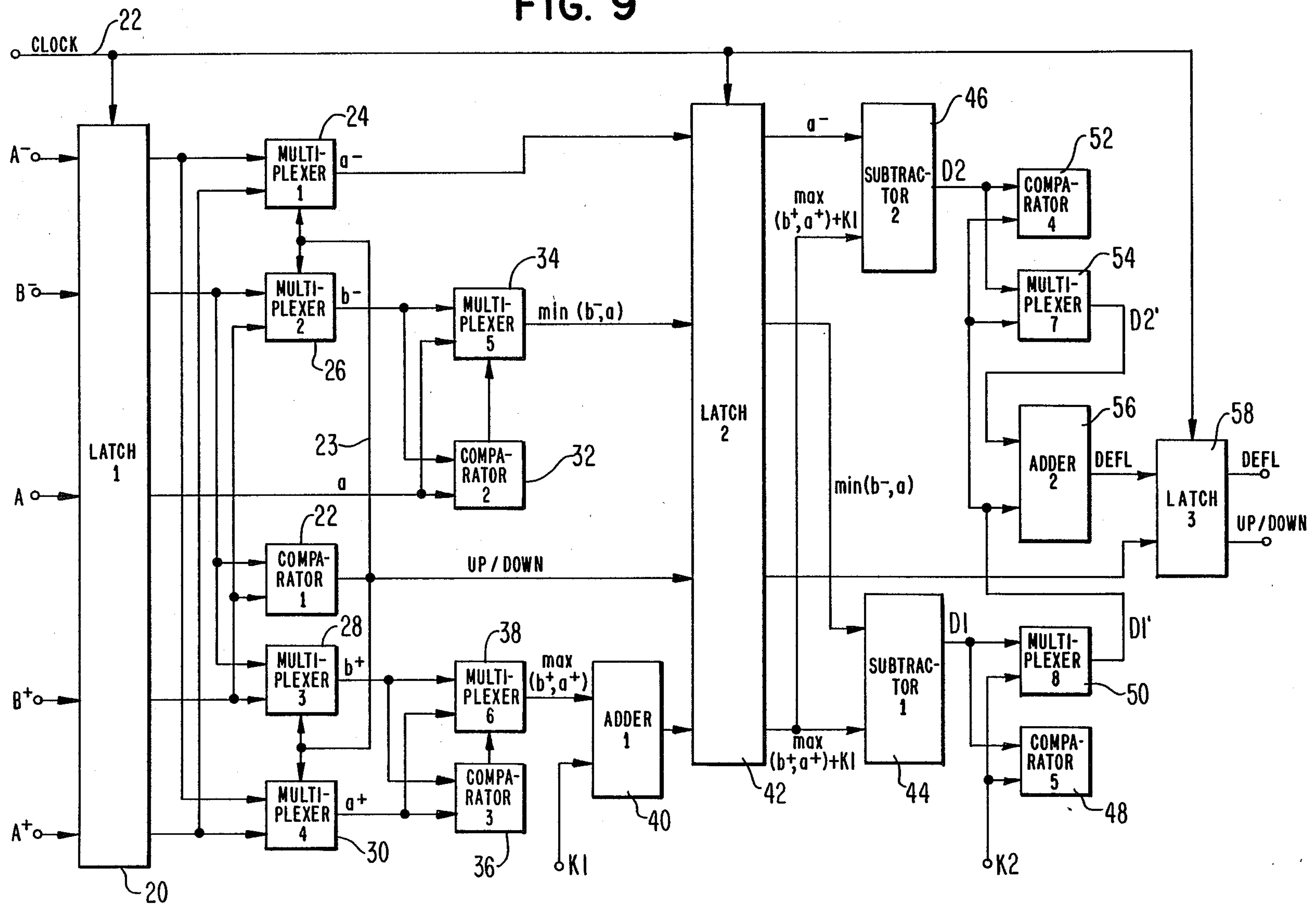
FIG. 9 is a schematic view of a decision logic unit of the line flicker suppression system of the present invention.
Figure 10:
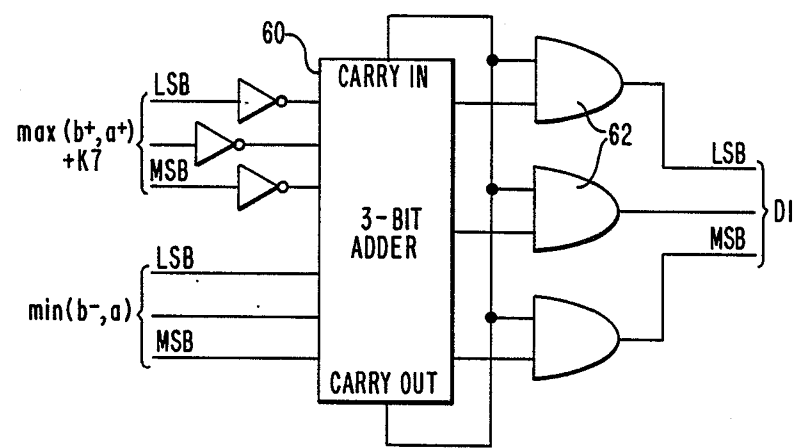
FIG. 10 is a schematic view of an adder/subtractor circuit of the line flicker suppression system of the present invention.
Figure 11:
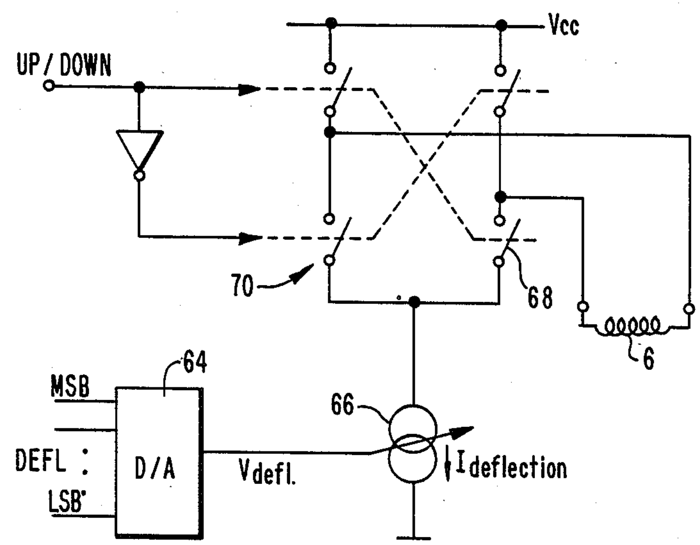
FIG. 11 is a schematic view of a driver unit of the line flicker suppression system of the present invention.

A system of this latter type is illustrated in more detail in FIGS. 9–11, in which FIG. 9 is an example of the 'decision logic' unit 18. The input to the unit are the five digital luminance signals A−, B−, A, B+ and A+ as delivered from the delay unit 14, FIG. 5, these signals being fed to a latch unit designated 20 or 'Latch 1', to which also a clock signal is supplied through a line 22 from a non-illustrated source. The clock signal operates to synchronize a row of latch units in the system. From the latch 20 the luminance signals B− and B+ are fed to a comparator 22, which will detect whether a possible deflection or displacement of the picture spot should be UP or DOWN, UP for B− > B+ and DOWN for B− < B+.

Through a line 23 a DOWN output signal from the comparator 22 will actuate four multiplexers 24, 26, 28 and 30 to effect an inversion of the respective luminance signals with signal A as 'point of inversion', i.e. signal A remains unaffected while on the outputs of the multiplexers A− and A+ as well as B− and B+ respectively, are interchanged.

In this manner the further calculation in the system may be effected numerically, irrespectively of the displacement being positive or negative (UP or DOWN), as this will be determined and effected by the output signal of the comparator 22 as supplied to the matrix-/driver unit 20 (FIG. 5).

Thus, the output signals of the described latch/multiplexer system, now designated a−, b−, a, b+ and a+, respectively, may be treated numerically for determining the required degree of displacement of the picture spot, irrespective of the direction thereof.

The signals a and b− are fed to a comparator 32 and an associated multiplexer 34 to the effect that the output signal of the latter corresponds to the minimum value of the combined a, b− signal, in as far as a high luminance in but a single point (or line) will be without interest.

Correspondingly, a comparator 36 and an associated multiplexer 38 will produce an output signal indicative of the maximum value of the combined signals b+ and a+, in as far as a low luminance value in but a single point (line) will not either be interesting. The respective cut-off signals are designated min. (b−, a) and max. (b+, a+).

In an adder unit 40 a predetermined constant K1 is added to the signal max. (b+, a+) in order to avoid quantetizing effects in the output signal of the decision unit.

Thereafter all the signals are latched in a further latch unit, designated 42 or 'Latch 2'. This is desirable because the decision logic is designed with a 'pipeline structure' for promoting the speed of the decision taking. Thus, the equipment may handle more decision processes simultaneously.

After latch 42 a subtractor 44 is provided for measuring the difference between the signals min. (b−, a) and max. (b+, a+)+K1, and another subtractor 46 is provided for measuring the difference between the signals a- and max. (b+, a+)+K1. The two difference signals are designated D1 and D2, respectively, and they will represent the occurring 'luminance jump' throughout the five picture points under observation.

Thereafter, again, a combination of a comparator 48 and a multiplexer 50 will select the minimum value of the signal D1 and an added constant K2, such that D1, if higher than K2, is set to be equal to K2, the rounded-off value of this signal being designated D1'. Likewise a combination of a comparator 52 and a multiplexer 54 will select the minimum value of the difference between the signals D2 and D1'. The resulting signal is designated D2'.

In the output end of the decision unit the signals D1' and D2' are added by means of an adder 56. The resulting signal, DEFL, will express the instant need of the amount of displacement of the picture spot A, and the output from the comparator 22 will be decisive for the correction being effected upwardly or downwardly.

The signals DEFL and UP/DOWN are latched in a latch unit 58 and are then supplied to the matrix/driver circuit 20 (FIG. 5).

The subtractors 44 and 46 are preferably based on an adder 60, e.g. a 3-bit adder (FIG. 10). The circuit is designed such that it can determine positive differences only, and it operates by inverting the lower of the two input signal values and then adding the signals, possibly also with addition of a carry-bit. In subtractor 44 the lower value is max. (b+, a+)+K1. If the difference is not positive the carry-bit will be zero, and by sending the output through AND-gates 62 receiving the carry-bit as one input it is ensured that the output will be zero if the difference is negative.

The associated driver as corresponding to driver 20 of FIG. 5 is illustrated in FIG. 11. The driver 11 receives the two digital input signals UP/DOWN and DEFL, of which the latter is a plural bit signal indicative of the desired instant deflection correction. In a D/A converter 64 this signal is converted into an analogue voltage Vdefl, which is used to control the deflection current Idefl in the deflector system by a voltage controlled current generator 66.

As in FIG. 5 the UP/DOWN signal is used to control a number of switches 68 in a matrix circuit 70 so as to determine the relevant direction of the deflection current through the deflector coil 6.

We claim:

1. A television receiver comprising means for suppression of line flicker including a detector means for detecting a potential line flicker producing operation of the television receiver, and a control means responsive to a detection signal from said detector means for producing a correction signal to a vertical deflector system of a picture reproducing means of the television receiver whereby a line track of a picture spot is displaced upwardly or downwardly to a location near or nearer a line level of a corresponding neighboring line in a preceding half picture, said detector means being adapted to provide continuous detection of a difference between an intensity of an actual video and an intensity of the actual video signal reproduced in a corresponding picture spot in at least one overlying line or under lying line in an interlace pattern on a screen of the television receiver, and wherein said control means is adapted to produce said correction signal only upon a detection by said detector means that the picture spot is moved along a line portion forming a horizontal line separation between an overlying picture area and an underlying picture area of a pronounced differing light intensity.

2. A television receiver according to claim 1, wherein said control means is adapted to effect a dynamic line displacement towards a picture area of a higher light intensity.

3. A television receiver according to claim 1, wherein said detector means is adapted to detect a situation wherein the picture spot is moved along a line portion, a light intensity of which is contrasting with and intensity in both the overlying picture area and the underlying picture area, and wherein said control means is adapted to hereby effect a displacement of said line portion less than a whole line width upwardly in one-half picture and downwardly in the other half picture for effecting at least an approximately merging of the line portions in the respective half pictures.

4. A television receiver according to one of claims 1 or 3, wherein said control means is adapted to effect a line displacement of 0.6–0.9 of a line width.

5. A television receiver according to claim 1, wherein said actual video signal is fed to a reproduction means through a delay means and memory means having a capacity corresponding to at least a single picture line, and wherein said detector means is adapted to continually detect the intensity of said actual video signal along one or more lines preceding an actually reproduced line in the same half picture.

6. A television receiver according to claim 1, wherein said detector means is operable to detect an intensity of a luminence signal, and wherein said is control means is operable to effect a predetermined displacement of a line track of the picture spot in response to a detected luminuous intensity by said detector means.

7. A television receiver according to claim 1, wherein said receiver is a cathode beam type, and wherein the control means is connected with a small deflector coil means separate from a vertical deflector coil means of the vertical deflector system, but operating in parallel therewith.

8. A television receiver according to claim 3, wherein said control means is adapted to effect a displacement of said line portion approximately half a line width upwardly in one half picture and downwardly in the other half picture for effecting at least an approximately merging of the line portions in the respective half pictures.

9. A television receiver according to claim 8, wherein said control means is adapted to effect a line displacement of 0.6–0.9 of a line width.

10. A television receiver according to claim 9, wherein said control means is adapted to effect a line displacement of approximately two-thirds of a line width.

11. A television receiver according to claim 4, wherein said control means is adapted to effect a line displacement of approximately two-thirds of a line width.

* * * * *